United States Patent
Xin et al.

(10) Patent No.: US 11,294,535 B2
(45) Date of Patent: Apr. 5, 2022

(54) VIRTUAL REALITY VR INTERFACE GENERATION METHOD AND APPARATUS

(71) Applicant: HUAWEI TECHNOLOGIES CO., LTD., Guangdong (CN)

(72) Inventors: Xin Xin, Shanghai (CN); Zhuolun Wang, Shanghai (CN); Sijia Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/851,454

(22) Filed: Apr. 17, 2020

(65) Prior Publication Data

US 2020/0241731 A1  Jul. 30, 2020

Related U.S. Application Data

(63) Continuation of application No. PCT/CN2018/110889, filed on Oct. 18, 2018.

(30) Foreign Application Priority Data

Oct. 20, 2017  (CN) .......................... 201710987222.0

(51) Int. Cl.
| | | |
|---|---|---|
| *G06F 3/0481* | (2013.01) | |
| *G06F 3/04815* | (2022.01) | |
| *G06T 1/20* | (2006.01) | |
| *G06T 19/00* | (2011.01) | |

(52) U.S. Cl.
CPC ............ *G06F 3/04815* (2013.01); *G06T 1/20* (2013.01); *G06T 19/006* (2013.01)

(58) Field of Classification Search
CPC ...... G06F 3/04815; G06T 1/20; G06T 19/006

USPC ......................................................... 715/848
See application file for complete search history.

(56) References Cited

U.S. PATENT DOCUMENTS

| | | |
|---|---|---|
| 2015/0015574 A1 | 1/2015 | Prahalad et al. |
| 2015/0249815 A1 | 9/2015 | Sandrew et al. |
| 2016/0063762 A1* | 3/2016 | Heuvel ................... G06K 9/52 345/633 |
| 2017/0109936 A1* | 4/2017 | Powderly ............ G06F 3/04883 |

(Continued)

FOREIGN PATENT DOCUMENTS

| | | |
|---|---|---|
| CN | 104869325 A | 8/2015 |
| CN | 106200881 A | 12/2016 |

(Continued)

OTHER PUBLICATIONS

Extended European Search Report issued in EP Application No. 18869268.5 dated Oct. 2, 2020, total 8 pages.

*Primary Examiner* — Sherrod L Keaton (57) ABSTRACT

Embodiments of the present disclosure relate to the field of communications technologies, and in particular, to a virtual reality (VR) interface generation method and an apparatus, to resolve a conventional problem of interface distortion, a twist, and image quality inconsistency when the interface is viewed by an observer. The method includes: obtaining head position information indicating a head position of an observer; generating a first user interface based on the head position information, where distances from all pixels on the first user interface to the observer are equal; and displaying a second user interface that is generated based on the first user interface.

18 Claims, 7 Drawing Sheets

(56) References Cited

U.S. PATENT DOCUMENTS

| | | | |
|---|---|---|---|
| 2017/0186131 A1 | 6/2017 | Kim | |
| 2017/0206689 A1* | 7/2017 | Eo | ........................... H04N 9/646 |
| 2017/0300113 A1* | 10/2017 | Han | ........................ G06F 3/013 |

FOREIGN PATENT DOCUMENTS

| | | | |
|---|---|---|---|
| CN | 106569654 A | 4/2017 | |
| CN | 107037957 A | 8/2017 | |
| CN | 107908278 A | 4/2018 | |
| WO | 2014199155 A1 | 12/2014 | |
| WO | 2016036625 A1 | 3/2016 | |
| WO | 2017043399 A1 | 3/2017 | |

* cited by examiner

VIRTUAL REALITY VR INTERFACE GENERATION METHOD AND APPARATUS

CROSS-REFERENCE TO RELATED APPLICATIONS

This application is a continuation of International Application No. PCT/CN2018/110889, filed on Oct. 18, 2018, which claims priority to Chinese Patent 201710987222.0, filed on Oct. 20, 2017. The disclosures of the aforementioned applications are hereby incorporated by reference in their entireties.

TECHNICAL FIELD

Example embodiments relate to the field of communications technologies, and in particular, to a virtual reality (VR) interface generation method and an apparatus.

BACKGROUND

A virtual reality (VR) system is also referred to as a virtual reality platform, and creates, through computer simulation, a virtual world in a three-dimensional space, and provides an observer with simulation of senses such as vision, an auditory sensation, and a tactile sensation, so that the observer can observe objects in the three-dimensional space in a timely and unconstrained manner, as if the observer has an immersed sense.

Figure 1:
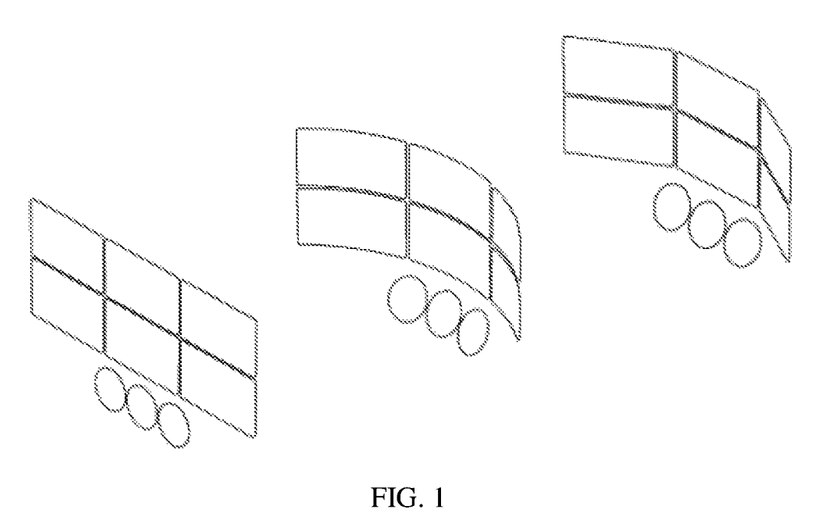
FIG. 1 is a schematic diagram of a pure planar user interface.

In a conventional technical solution, in VR experience, as shown in FIG. 1, user interfaces of most VR products are usually designed to be planar interfaces perpendicular to the ground or surrounding interfaces toward directions of viewers.

Figure 2:
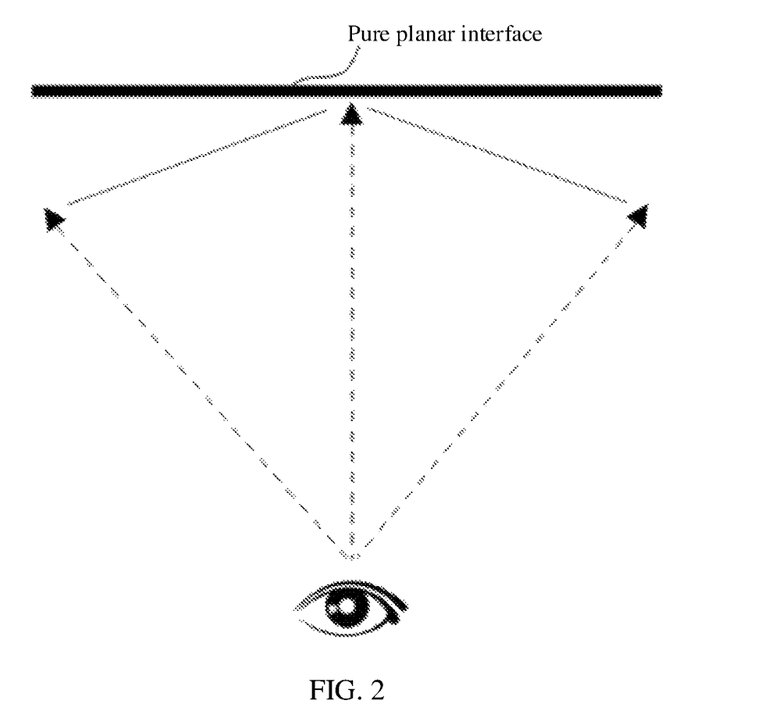
FIG. 2 is a schematic diagram of a pure planar user interface viewed by an observer in the prior art.

However, because eyeballs of an observer are spherical, when an object on a pure planar interface is reflected on a curved retina, a twist inevitably occurs, so that an image seen by the observer is distorted. Moreover, because eyes of the observer struggle to correct the twist to the maximum extent, fatigue of the eyes of the observer is exacerbated. Second, as shown in FIG. 2, a distance between a center of the pure planar interface and the eyes of the observer is not equal to distances from four sides around the pure planar interface to the eyes of the observer. This may lead to differences in brightness and image quality between a center and two sides of a displayed image, and a sense of distance is increased, affecting an overall viewing effect.

SUMMARY

Embodiments of the present disclosure provide a virtual reality (VR) interface generation method and an apparatus, to resolve a conventional problem of interface distortion, a twist, and image quality inconsistency when the interface is viewed by an observer.

To resolve the foregoing technical problem, the technology provides the following technical solutions:

According to a first aspect, this application provides a virtual reality (VR) interface generation method, including: obtaining head position information used to indicate a head position of an observer; generating a first user interface based on the head position information, where distances from all pixels on the first user interface to the observer are equal; and displaying a second user interface that is generated based on the first user interface.

An embodiment of the application provides the virtual reality interface generation method. The head position information used to indicate the head position of the observer is obtained, and the first user interface is generated based on the head position information. Because the distances from all the pixels on the generated first user interface to the observer are equal, distances from the observer and pixels on the second user interface that is generated based on the first user interface and that is finally displayed to the observer are equal. Because eyeballs of the observer are spherical, the second user interface displayed by a VR device to the observer has a particular curvature, to minimize a visual twist generated by the observer. In this way, an image seen by the observer when the observer views the second user interface can be prevented from being distorted, and differences in brightness and image quality of different portions of an image displayed at different positions on the second user interface can be reduced, thereby improving VR experience.

With reference to the first aspect, in a first possible implementation of the first aspect, the generating a first user interface based on the head position information includes: changing a position of each pixel on a third user interface based on the head position information and coordinate information of a center point on the third user interface, where distances from all the pixels after the change to the observer are equal; and using an interface generated by each pixel after the change as the generated first user interface. The position of each pixel on the third user interface is changed, to generate the first user interface based on the third user interface.

With reference to the first aspect or the first possible implementation of the first aspect, in a second possible implementation of the first aspect, the third user interface is a pure planar interface.

With reference to any one of the first aspect to the second possible implementation of the first aspect, in a third possible implementation of the first aspect, the changing a position of each pixel on a third user interface based on the head position information and coordinate information of a center point on the third user interface includes: determining a reference distance based on the head position information and the coordinate information of the center point, where the reference distance is used to indicate a distance between the head of the observer and the center point; and changing the position of each pixel on the third user interface based on the reference distance. In a process of changing the position of each pixel, accuracy of the finally generated first user interface can be improved based on the reference distance, and efficiency of generating the first user interface is improved.

With reference to any one of the first aspect to the third possible implementation of the first aspect, in a fourth possible implementation of the first aspect, the changing the position of each pixel on the third user interface based on the reference distance includes:

calculating, according to a formula $$dz = R\left(1 - \cos\frac{180° \times Lxy}{\pi R}\right),$$

a distance by which each pixel moves on a Z axis of a three-dimensional coordinate system, where dz represents the distance by which each pixel moves on the Z axis, R represents the reference distance, and Lxy represents a half of a length of the third user interface; calculating, according to a formula $$dx = \frac{dz * x_0}{Lxy} \times \tan\frac{180° \times Lxy}{\pi R},$$

a distance by which each pixel moves on an X axis of the three-dimensional coordinate system, where dx represents the distance by which the pixel moves on the X axis; calculating, according to a formula $$dy = \frac{dz * y_0}{Lxy} \times \tan\frac{180° \times Lxy}{\pi R},$$

a distance by which each pixel moves on a Y axis of the three-dimensional coordinate system, where dy represents the distance by which the pixel moves on the Y axis, and $y_0$ represents a parameter of a vertical coordinate of the pixel on the third user interface; and changing the position of each pixel based on the distance by which the pixel moves on the Z axis, the distance by which the pixel moves on the X axis, and the distance by which the pixel moves on the Y axis of the three-dimensional coordinate system. Distances by which each pixel needs to move on the X axis, the Y axis, and the Z axis in the three-dimensional coordinate system are respectively calculated according to the foregoing formulas, to accurately move each pixel to a specified position, so that distances from all the pixels after the change to the observer are equal, thereby improving accuracy of the second user interface displayed to the observer.

With reference to any one of the first aspect to the fourth possible implementation of the first aspect, in a fifth possible implementation of the first aspect, before the changing a position of each pixel on a third user interface based on the head position information and coordinate information of a center point on the third user interface, the method further includes: generating the third user interface based on the head position information and a preconfigured parameter. Before the first user interface is generated, the third user interface is generated based on the preconfigured parameter. In this way, the second user interface may be generated by adjusting the position of each pixel on the third user interface.

With reference to any one of the first aspect to the fifth possible implementation of the first aspect, in a sixth possible implementation of the first aspect, the third user interface includes at least one or more of a card, a text, and a button that have interaction with the observer.

With reference to any one of the first aspect to the sixth possible implementation of the first aspect, in a seventh possible implementation of the first aspect, the coordinate information of the center point on the third user interface is obtained through default configuration, or obtained through configuration based on a parameter input by a user.

With reference to any one of the first aspect to the seventh possible implementation of the first aspect, in an eighth possible implementation of the first aspect, the displaying a second user interface that is generated based on the first user interface includes: receiving a first parameter, where the first parameter includes any one or a combination of parameters such as an interface display ratio, brightness, a hue, saturation, resolution, a color temperature, a distance between the third user interface and the observer, and a size of a user interface; and adjusting the first user interface based on the first parameter, to generate the second user interface; and displaying the second user interface. After the first user interface is generated, the first user interface is adjusted, to generate the second user interface, so that the second user interface finally displayed to the observer meets a requirement of the observer.

According to a second aspect, this application provides a virtual reality (VR) device. The device includes at least a processor, a memory, a sensor system, a display, a central processing unit (CPU), a bus, and a graphics processing unit (GPU). The processor, the memory, the sensor system, the display, the central processing unit (CPU), and the graphics processing unit (GPU) are connected by using the bus. The sensor system is configured to: obtain a head position of an observer, and send, to the CPU, head position information used to indicate the head position of the observer. The memory stores an instruction and a program, and the CPU is configured to execute the instruction and the program to generate, based on the head position information, a first user interface, where distances from all pixels on the first user interface to the observer are equal. The graphics processing unit (GPU) is configured to generate, based on the first user interface, a second user interface. The display is configured to display the second user interface.

With reference to the second aspect, in a first possible implementation of the second aspect, the CPU is further configured to: change a position of each pixel on a third user interface based on the head position information and coordinate information of a center point on the third user interface, where distances from all the pixels after the change to the observer are equal; and use an interface generated by each pixel after the change as the generated first user interface.

With reference to the second aspect or the first possible implementation of the second aspect, in a second possible implementation of the second aspect, the third user interface is a pure planar interface.

With reference to any one of the second aspect to the second possible implementation of the second aspect, in a third possible implementation of the second aspect, the CPU is further configured to: determine a reference distance based on the head position information and the coordinate information of the center point, where the reference distance is used to indicate a distance between the head of the observer and the center point; and change the position of each pixel on the third user interface based on the reference distance.

With reference to any one of the second aspect to the third possible implementation of the second aspect, in a fourth possible implementation of the second aspect, the CPU is further configured to: calculate, according to a formula $$dz = R\left(1 - \cos\frac{180° \times Lxy}{\pi R}\right),$$

a distance by which each pixel moves on a Z axis of a three-dimensional coordinate system, where dz represents the distance by which the pixel moves on the Z axis, R represents the reference distance, and Lxy represents a half of a length of the third user interface; calculate, according to a formula $$dx = \frac{dz * x_0}{Lxy} \times \tan\frac{180° \times Lxy}{\pi R},$$

a distance by which each pixel moves on an X axis of the three-dimensional coordinate system, where dx represents the distance by which the pixel moves on the X axis; calculate, according to a formula $$dy = \frac{dz * y_0}{Lxy} \times \tan\frac{180° \times Lxy}{\pi R},$$

a distance by which each pixel moves on a Y axis of the three-dimensional coordinate system, where dy represents a distance by which the pixel moves on the Y axis, and $y_0$ represents a parameter of a vertical coordinate of the pixel on the third user interface; and change the position of each pixel based on the distance by which the pixel moves on the Z axis, the distance by which the pixel moves on the X axis, and the distance by which the pixel moves on the Y axis of the three-dimensional coordinate system.

With reference to any one of the second aspect to the fourth possible implementation of the second aspect, in a fifth possible implementation of the second aspect, the CPU is further configured to generate the third user interface based on the head position information and a preconfigured parameter.

With reference to any one of the second aspect to the fifth possible implementation of the second aspect, in a sixth possible implementation of the second aspect, the third user interface includes at least one or more of a card, a text, and a button that have interaction with the observer.

With reference to any one of the second aspect to the sixth possible implementation of the second aspect, in a seventh possible implementation of the second aspect, the coordinate information of the center point on the third user interface is obtained through default configuration, or obtained through configuration based on a parameter input by a user.

With reference to any one of the second aspect to the seventh possible implementation of the first aspect, in an eighth possible implementation of the second aspect, the communications interface is configured to receive a first parameter, where the first parameter includes any one or a combination of parameters such as an interface display ratio, brightness, resolution, a color temperature, a hue, saturation, a distance between the third user interface and the observer, and a size of a user interface. The processor is configured to adjust the first user interface based on the first parameter, to generate the second user interface. The display is configured to display the second user interface.

DESCRIPTION OF EXAMPLE EMBODIMENTS

Before the example methods provided in this application are described, related terms used in this application are first described:

A pixel in the present disclosure is a point of a minimum unit into which an image is divided and that is displayed on a virtual reality helmet.

Three-dimensional coordinate information: In a virtual reality system, any position information has space information of three axial directions of X, Y, and Z, and includes depth information of a Z axis direction that is not included in a conventional two-dimensional system. A coordinate expression at any position in the three-dimensional coordinate system may be $(X_0, Y_0, Z_0)$.

Figure 3:
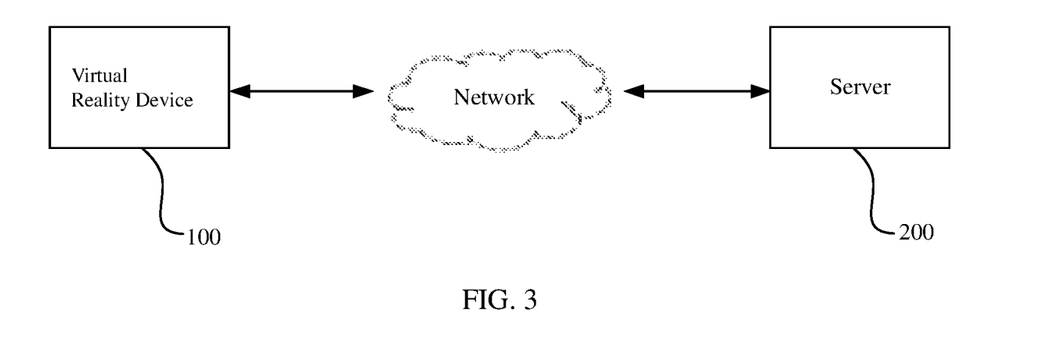
FIG. 3 is a schematic diagram of a scenario according to an embodiment of the present invention.

FIG. 3 is a schematic diagram of a communications system according to an embodiment of this application. As shown in FIG. 3, the communications system includes a virtual reality device 100, a network, and a remote server 200. The virtual reality device 100 is connected to the server 200 by using the network.

The server 200 may integrate a panoramic camera, and may further include an independent video server or an integrated video/image storage system. A captured panoramic video is sent to the virtual reality device 100 by using a wireless network system. In this way, a user of the virtual reality device 100 may experience, in real time, a video captured by the remote panoramic camera, feeling that the user visits a "site" in which a remote camera is located, as if the user has an immersed sense.

It should be noted that, embodiments of the present disclosure are not limited to the foregoing use scenarios, and these use scenarios are merely examples for description. The network may be a wireless network system, or a wired network, and this is not limited in embodiments of the present disclosure.

The virtual reality device 100 may be a device that can be conveniently carried around and that has a function of playing a VR video, for example, a virtual reality helmet (such as an integrated virtual reality helmet, a virtual reality helmet connected to a mobile phone end, a virtual reality helmet connected to a desktop computer, an optical waveguide mixed reality helmet, or an augmented reality helmet) or VR glasses, or may be a device having a function of playing a panoramic video, for example, a computer or a television.

The server 200 may be a cloud server or a social server. The server 200 is configured to send content information to the virtual reality device 100 by using the network. The content information includes but is not limited to an image, a text, an animated sound effect, a video, and the like.

Figure 4:
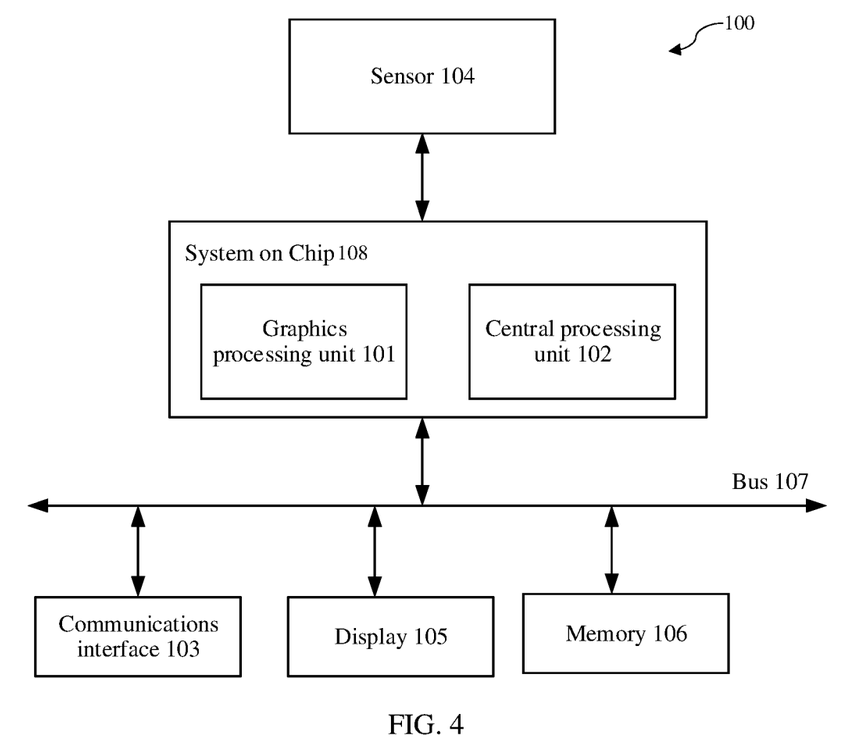
FIG. 4 is a schematic structural diagram of a virtual reality device according to an embodiment of the present invention.

The virtual reality device 100 (using a virtual reality helmet as an example) includes: an optical system and a circuit system. The optical system mainly includes an optical lens, for example, a convex lens and a lens position adjustment apparatus, and the lens includes a left eye lens and a right eye lens. The left eye lens and the right eye lens are disposed in front of a display, that is, respectively located between the left eye and the right eye of an observer and the display. The left eye lens and the right eye lens may be replaced, and the lens position adjustment apparatus may adjust positions of the left eye lens and the right eye lens, to adjust a distance between the lens and the display, so that the virtual reality device 100 is applicable to observers having different vision. FIG. 4 is a schematic diagram of a circuit system structure of the virtual reality device 100. In the circuit system structure of the virtual reality device 100, at least a system on chip (SoC) 108, a memory 106, a display 105, a communications interface 103, a sensor 104, and a bus 107 are disposed. The SoC, the memory 106, the display 105, the communications interface 103, and the sensor 104 are connected by using the bus 107. The SoC includes a central processing unit (CPU) 102 and a graphics processing unit (GPU) 101. Another virtual reality helmet may include only an optical system. A circuit system may be replaced with an intelligent terminal device (for example, audio/video devices such as a mobile phone, a tablet computer, a game console, and a high definition player).

Figure 5:
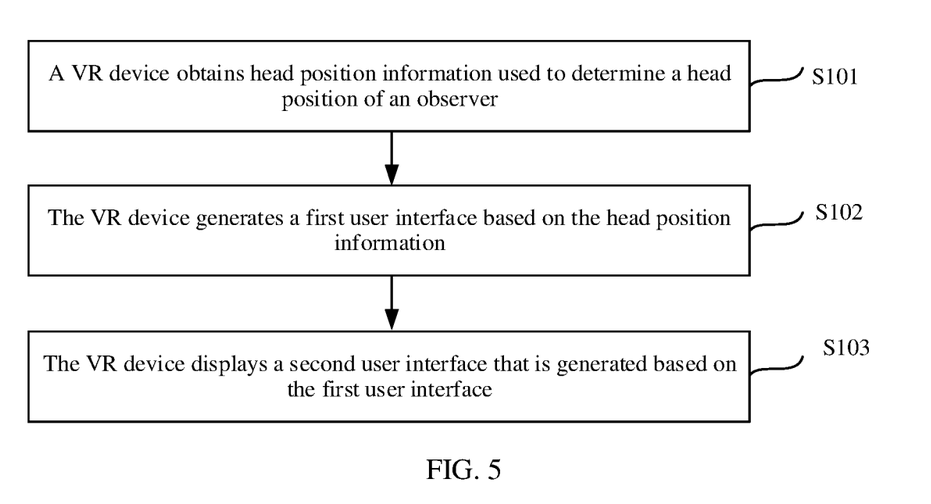
FIG. 5 is a schematic flowchart of a virtual reality (VR) interface generation method according to an embodiment of the present invention.

The memory 106 is configured to store application program code supporting the virtual reality device 100 in performing the VR interface generation method shown in FIG. 5. The CPU 102 is configured to execute an application program stored in the memory 106, and some processing (such as rendering) strongly correlated to graphics may be performed by the GPU 101. The virtual reality device 100 may further include the communications interface 103, configured to communicate with another device or a communications network.

The GPU 101 is configured to: process an image or a video signal, for example, render the image or the video signal by using a rendering algorithm, and send the processed image or video signal to the CPU 102.

The CPU 102 is configured to: invoke a program and an instruction stored in the memory 106, and manage configuration of each functional module and a collection operation of sensor data, and may be a single-core or multi-core processor (CPU).

The SoC 108 may include, for example, a CPU, a GPU, a DSP, an application-specific integrated circuit (ASIC), an FPGA, or another programmable logic device, a transistor logic device, a hardware component, or any combination thereof, and is encapsulated in a form of a chip on a hardware layer, for example, a HiSilicon Kirin chip or a Qualcomm Snapdragon chip. It should be noted that in an actual process, the GPU and the CPU may be integrated into one chip, or may be encapsulated into two independent chips. This is not limited in embodiments of the present disclosure. In this application, as an example, the GPU and the CPU are integrated into one chip, for example, the GPU and the CPU are integrated into a same chip (which may also be referred to as a processor) in FIG. 4. The processor may implement or execute various example logical blocks, modules, and circuits described with reference to content disclosed in the present disclosure. The bus 107 is configured to connect the foregoing components, and the bus 107 may be one or more buses, to ensure communication between the components. The bus 107 may be various buses used for communication, such as an AXI bus, a PCI bus, or an EISA. The bus may be classified into an address bus, a data bus, a control bus, and the like. For ease of representation, only one thick line is used to represent the bus in FIG. 4, but this does not mean that there is only one bus or only one type of bus.

The communications interface 103 may support communication between the VR device 100 and another device through a wireless network, a wired network, Bluetooth, or another communications manner. This is not limited herein. For example, the communications interface 103 is configured to access different wireless network systems (for example, an LTE network), to send and receive a radio signal, and may be a baseband chip integrated with a radio frequency chip.

The display 105 is configured to display an image, and display a video, and may be a liquid crystal display (LCD) with ultra-high resolution, a high refresh rate, and a shorter response time, to bring, in cooperation with the optical imaging system, high-definition image quality and a more smooth display effect.

The sensor 104 is configured to: collect motion status data and environment status data of an observer, and send the collected data to the CPU. The sensor 104 is further configured to collect a motion status and a position of the head of the observer, for example, head rotation data of the observer or head position information, such as displacement and a speed resulting from back and forth movement of the observer, or an action such as head swinging, head shaking, head raising, or head bowing of the observer, or an operation such as a click and pressing input by the observer. This is not limited herein. For example, the sensor 104 may be an inertial measurement unit (IMU) that is disposed in the VR device and that is an apparatus configured to measure a tri-axis attitude angle (or an angular rate) and acceleration.

In an alternative embodiment, the virtual reality device 100 further includes an image capturing device, which may be a panoramic camera apparatus including one or more cameras, configured to capture image signals. For example, a camera is configured to collect a video or an image and send the video or the image to a GPU.

The memory 106 may be a read-only memory (ROM) or another type of static storage device that may store static information and a static instruction; or a random access memory (RAM) or another type of dynamic storage device that may store information and an instruction; or may be an electrically erasable programmable read-only memory (EEPROM), a compact disc read-only memory (CD-ROM) or another compact disc storage medium, optical disc storage (including a compact disc, a laser disc, an optical disc, a digital versatile disc, a Blue-ray disc, or the like) and magnetic disk storage medium, another magnetic storage device, or any other mediums that may be configured to carry or store expected program code in a form of an instruction or a data structure and that is accessible to a computer, but is not limited thereto. The memory 106 may independently exist and be connected to the processor(s) by using the bus 107. Alternatively, the memory 106 may be integrated with the processor(s).

Method or algorithm steps described in combination with the content disclosed below may be implemented by hardware, or may be implemented by a processor by executing one or more software instructions. The software instruction(s) may include corresponding software modules, and the software modules may be stored in a RAM, a flash memory, a ROM, an EPROM, an EEPROM, a register, a hard disk, a removable hard disk, a CD-ROM, or any storage mediums of other forms well-known in the art. For example, a storage medium is coupled to a processor, so that the processor(s) may read information from the storage medium or write information into the storage medium. Certainly, the storage medium may alternatively be a component of the processor, or the processor and the storage medium may be used as discrete components.

As shown in FIG. 5, this application provides a virtual reality (VR) interface generation method, including the following steps.

S101. A VR device obtains head position information used for determining a head position of an observer.

Optionally, the head position information includes a posture of the head of the observer, orientation information of the head, and the like.

For example, the posture of the head of the observer may be head bowing or head raising. The orientation information of the head may be an orientation of the head of the observer. The orientation information of the head of the observer may be obtained by the VR device by tracking head actions of the observer. For example, the head actions of the observer may be detected by using an inertial measurement module of the VR device, to obtain the orientation information of the head of the observer. The orientation information includes: an amount of movement in an X direction, an amount of movement in a Y direction, an amount of movement in a Z direction, an amount of rotation around an X axis, an amount of rotation around a Y axis, and an amount of rotation around a Z axis of the head of the observer. This is not limited in embodiments of the present disclosure.

S102. The VR device generates a first user interface based on the head position information, where distances from all pixels on the first user interface to the observer are equal.

Optionally, in this embodiment, the distance between the pixel and the observer is a distance between the pixel and the head of the observer, and may further be a distance between the pixel and an eye of the observer.

Figure 6:
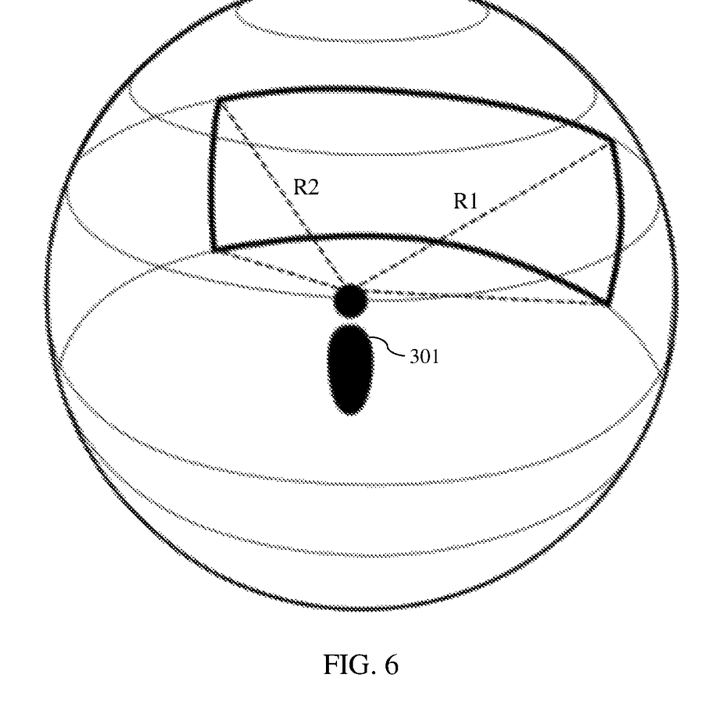
FIG. 6 is a first schematic diagram of a first user interface according to an embodiment of the present invention.

It may be understood that the first user interface generated in this embodiment is a double-curvature interface. As shown in FIG. 6, the double-curvature interface, namely, the entire first user interface, surrounds toward a direction of the observer, and the head of the observer is used as a circle center, so that the distances from all the pixels on the first user interface to the head of the observer are equal, that is, radii are equal.

S103. The VR device displays a second user interface that is generated based on the first user interface.

This application provides the virtual reality interface generation method. The head position information used to indicate the head position of the observer is obtained, and the first user interface is generated based on the head position information. Because the distances from all the pixels on the generated first user interface to the observer are equal, distances from the observer to pixels on the second user interface that is generated based on the first user interface and that is finally displayed to the observer are equal. Because eyeballs of the observer are spherical, the second user interface displayed by a VR device to the observer has a particular curvature, to minimize a visual twist generated by the observer. In this way, an image seen by the observer when the observer views the second user interface can be prevented from being distorted, and differences in brightness and image quality among different portions of the image displayed at different positions on the second user interface can be reduced, thereby improving VR experience.

In a possible implementation, step S103 in this application may be implemented in the following manner:

The VR device renders the first user interface by using a rendering algorithm and compiles the rendered first user interface into API data. Then the VR device renders data of virtual three-dimensional objects, to synthesize an interface, a model, a text, and the like, and finally encapsulates the data, and displays the data to the observer after a hardware end of the VR device renders the data again.

In another possible implementation, step S103 in this application may further be implemented in the following manner:

The VR device receives a first parameter, where the first parameter is used to adjust the first user interface. The VR device adjusts the first user interface based on the first parameter, to generate a second user interface, and displays the generated second user interface.

In a possible implementation, the adjusting, by the VR device, the first user interface based on the first parameter further includes: after adjusting the first user interface based on the first parameter, rendering the adjusted first user interface by using the rendering algorithm, to generate the second user interface.

For a process in which the VR device renders the first user interface by using the rendering algorithm, may refer to an existing solution in the art. This is not limited in embodiments of the present disclosure.

For example, the first parameter may be any one or a combination of more parameters such as an interface display ratio, brightness, a hue, a resolution, a color temperature, saturation, a distance between a third user interface and the observer, and a size of a user interface.

Optionally, the first parameter may be input by the observer to the VR device, or may be obtained by the VR device from a terminal that is connected to the VR device and that stores a habit of the user. This is not limited in embodiments of the present disclosure.

In still another possible implementation, step S103 in this application may further be implemented in the following manner:

The VR device adjusts the first user interface based on the preconfigured first parameter, and after adjusting the first user interface, renders the adjusted first user interface by using the rendering algorithm, to generate the second user interface.

The preconfigured first parameter may be stored in a memory of the VR device at delivery of the VR device, or may be stored in another storage apparatus of the VR device. Certainly, the preconfigured first parameter may alternatively be preset by an observer based on a use habit. This is not limited in embodiments of the present disclosure.

Certainly, an application program for obtaining user behavior may also be installed on the VR device. The application program is connected to a terminal that stores the user behavior. In this way, when the observer logs in by using the application program, the VR device synchronizes the user behavior by using the application program, to obtain the first parameter.

In a possible implementation, step S102 in this application may be implemented in the following manner:

S1021. Change a position of each pixel on a third user interface based on the head position information and coordinate information of a center point on the third user interface, where distances from all the pixels after the change to the observer are equal.

Optionally, the third user interface in this application is a pure planar interface or a surrounding pure planar interface, and is also referred to as a single-curvature interface.

The pure planar interface may be understood as a planar user interface perpendicular to the ground. The surrounding pure planar interface means that an interface that is in a same horizontal line as a field of view of an observer in the user interface is curved, and is similar to a radian of an eyeball of a person. In directions that are in a same horizontal line as the field of view of the observer, distances between the observer and the user interface are equal.

It may be understood that in an actual process, to generate a first user interface, the VR device in this application has the third user interface, but the third user interface may not be displayed to the observer in the actual process. That is, the observer does not see the third user interface in the actual process, and in a processing process of the VR device, the third user interface is used by the VR device to generate the first user interface.

The third user interface may be a user interface selected from a plurality of user interfaces preconfigured by the VR device, for example, a user interface selected based on the observed head position information, after the observer starts the VR device. Alternatively, the third user interface may be generated by the VR device after the observer starts the VR device.

Optionally, in a possible implementation, before S1021 is performed in this application, the method further includes the following step:

Step S1023. The VR device generates the third user interface based on the head position information and a preconfigured parameter.

The preconfigured parameter is used to determine a parameter of the third user interface. The parameter of the third user interface may be a length, a height, a ratio of the third user interface, and a distance between the observer and the third user interface.

It may be understood that, the VR device has a plurality of groups of preconfigured parameters in an actual process, and each group of preconfigured parameters is associated with one piece of head position information. In this way, after the VR device is started and the head position information is determined, the VR device may obtain, from the preconfigured parameter, the preconfigured parameter associated with the head position information, to generate the third user interface.

It may be understood that, an association relationship between each of the plurality of groups of preconfigured parameters and the head position information may be recorded based on a use habit of the observer, or may be configured at delivery of the VR device, or obtained in another manner. This is not limited in embodiments of the present disclosure.

Because in an actual process, when the observer is in different scenarios, requirements of the observer on the third user interface are different. If the third user interface is generated based on the preconfigured parameter, the generated third user interface may not meet viewing experience of the observer, and consequently the first user interface finally generated based on the third user interface cannot meet the requirements of the observer. Therefore, in another possible implementation, before step S1021 in this application, the method further includes step S1 and step S2.

S1. The VR device receives a first input parameter, where the first input parameter is used to determine a parameter of the third user interface.

For example, the first input parameter may be one or more of the length, the height, the ratio of the third user interface, the distance between the observer and the third user interface, a scenario in which the observer is located, a film watching type, a position at which the observer is located, a screen parameter of the third user interface, or an image display scale.

For example, the scenario in which the observer is located may be: watching other videos (such as playing a game and watching all virtual reality interfaces having display functions, such as a television) or a VR cinema.

For example, in this embodiment, an example in which the scenario in which the observer is located in a VR cinema is used. In this case, the first input parameter may include: a film watching type (IMAX or normal), a position (which row and which column), and a screen curvature that a film watching interface automatically adapts to, an image size, an image scale, and the like.

Optionally, the VR device in this application may further be connected to a terminal (for example, a mobile phone) storing a habit of a user. In this way, the VR device may obtain the habit of the user by interacting with the terminal, for example, (data such as ticket and seat selection habits that a user usually has). Therefore, the VR device may automatically properly adapt to a viewing position and a screen attribute based on the obtained habit of the user. In addition, when user habits of two or more users are included, the user habits corresponding to the users are different, and it may be determined based on the user habit corresponding to each user.

It may be understood that, the VR device in this application is further configured to receive content information sent by the server. The content information includes but is not limited to an image, a text, an animated sound effect, a video, and the like.

Optionally, the content information may be a poster material required by the first user interface. For example, if an image or a video needs to be displayed on the first user interface is A, the content information may be a poster material required by A. In this way, when generating the third user interface, the VR device may generate a corresponding poster material on the third user interface based on the foregoing content information.

S2. The VR device generates the third user interface based on the first input parameter and the head position information.

S1022. Use the interface generated by each pixel after the change as the generated first user interface.

In a possible implementation, step S1021 in this application may be implemented in the following manner: A reference distance is determined based on the head position information and the coordinate information of the center point, where the reference distance is used to indicate a distance between the head of the observer and the center point; and the position of each pixel on the third user interface is changed based on the reference distance.

It may be understood that, when changing the position of each pixel on the third user interface based on the reference distance, the VR device may change the position of each pixel based on only the reference distance, but is not limited to only the reference distance, that is, in an actual process, the position of each pixel on the third user interface may be changed with reference to the reference distance and another parameter.

For example, the changing the position of each pixel on the third user interface based on the reference distance in this embodiment may be implemented in the following manner:

calculating, according to a formula $$dz = R\left(1 - \cos\frac{180° \times Lxy}{\pi R}\right),$$

a distance by which each pixel moves on a Z axis of a three-dimensional coordinate system, where dz represents the distance by which the pixel moves on the Z axis, R represents a reference distance, and Lxy represents a half of a length of the third user interface; calculating, according to a formula $$dx = \frac{dz * x_0}{Lxy} \times \tan\frac{180° \times Lxy}{\pi R},$$

a distance by which each pixel moves on an X axis of the three-dimensional coordinate system, where $x_0$ represents a parameter of a horizontal coordinate of the pixel on the third user interface; calculating, according to a formula $$dy = \frac{dz * y_0}{Lxy} \times \tan\frac{180° \times Lxy}{\pi R},$$

a distance by which each pixel moves on a Y axis of the three-dimensional coordinate system, where $y_0$ represents a parameter of a vertical coordinate of the pixel on the third user interface; and changing the position of each pixel based on the distance by which the pixel moves on the Z axis, the distance by which the pixel moves on the X axis, and the distance by which the pixel moves on the Y axis of the three-dimensional coordinate system.

It should be noted that, in an actual process, the foregoing formulas for the user to calculate the distance by which each pixel moves on the Z axis of the three-dimensional coordinate system, the distance by which the pixel moves on the X axis, and the distance by which the pixel moves on the Y axis may be usually stored in the memory of the VR device. When a processor of the VR device calculates the distance by which each pixel moves on the Z axis, the distance by which the pixel point moves on the X axis, and the distance by which the pixel point moves on the Y axis of the three-dimensional coordinate system, the foregoing formulas may be invoked.

An example in which the third user interface is a pure planar user interface is used below to describe a principle of generating a formula for the distance by which each pixel moves on the Z axis, the distance by which the pixel moves on the X axis, and the distance by which the pixel moves on the Y axis of the three-dimensional coordinate system:

In an actual process, after generating the third user interface, the VR device uses the third user interface as a whole, and determines the coordinate information of the center point on the third user interface.

In a possible implementation, when the third user interface is generated based on a preconfigured parameter, the VR device may obtain the coordinate information of the center point through default configuration.

In another possible implementation, because the VR device may be generated based on a first input parameter and head position information that are input by the observer in an actual process, in this case, the VR device may determine coordinate information of a center point based on the head position information and the first input parameter.

For example, the first input parameter includes a distance between the observer and the third user interface. In this case, the VR device may call the head position information and the distance between the observer and the third user interface, to determine the coordinate information of the center point.

Figure 7:
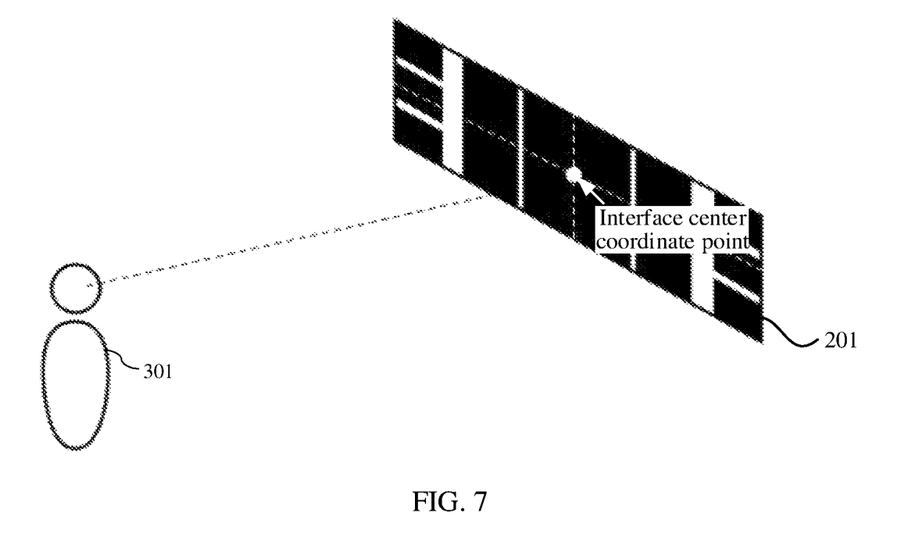
FIG. 7 is a schematic diagram of a relationship between an observer and a center point according to an embodiment of the present invention.
Figure 8:
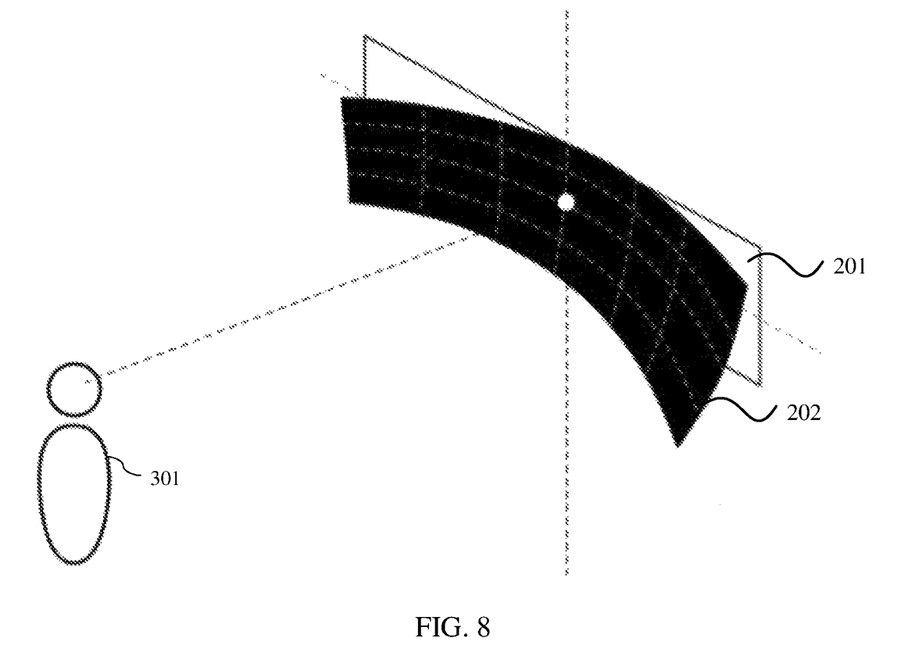
FIG. 8 is a schematic diagram of conversion of a pure planar user interface into a first user interface on which distances from all pixels to an observer are equal according to an embodiment of the present invention.

As shown in FIG. 7, an example in which the third user interface is a pure planar user interface is used for description. To enable that distances from all pixels on the third user interface 201 to the observer are equal, in an actual process, it may be understood that a double-curvature state in which the third user interface 201 is curved in both horizontal and vertical directions and all the pixels have equal distances to the observer. As shown in FIG. 8, the entire interface of a first user interface 202, eventually generated based on the third user interface 201, surrounds toward a direction of the observer, to form a sphere using the head of the observer as a circle center, so that distances from points on the sphere to the head of the user, that is, radii, are equal, for example, R1 is equal to R2 in FIG. 6.

Therefore, in an example process, an algorithm is required to calculate distances by which each pixel on the third user interface 201 moves respectively on the X axis, the Y axis, and the Z axis, namely, dx, dy and dz, when the third user interface 201 is converted into the first user interface 202.

Figure 9:
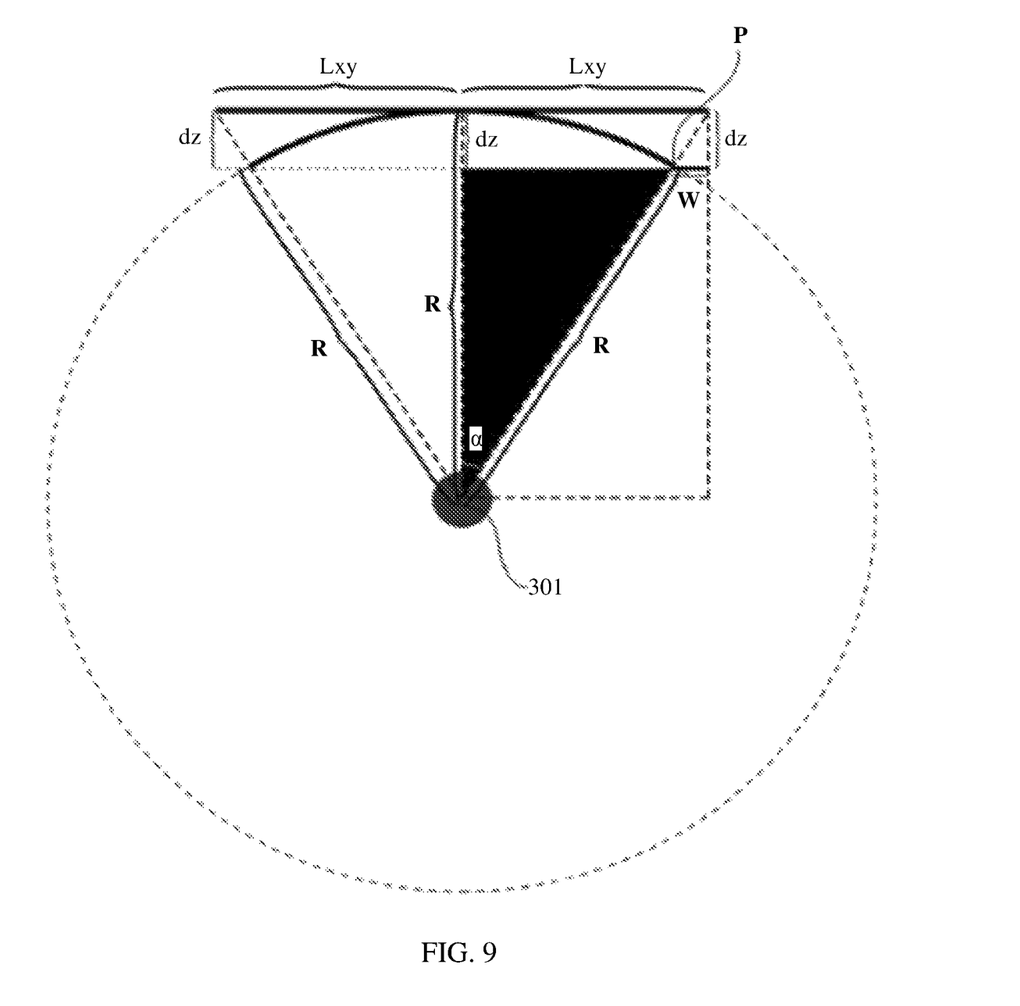
FIG. 9 is a schematic diagram of an algorithm for determining a movement distance of a pixel according to an embodiment of the present invention.

As shown in FIG. 9, when a dual-curvature first user interface is generated based on the pure planar third user interface 201, dz is the distance by which each pixel on the third user interface 201 moves on the Z axis, and R, representing a radius of a circle that uses an observer 301 as a circle center, is a distance between the observer 301 and a center point of the first user interface, and is also a distance between the observer 301 and the center point on the third user interface 201. x represents a horizontal coordinate value of each pixel on the planar third user interface 201, and y represents a vertical coordinate value of each pixel on the third user interface. 2Lxy represents the length of the planar third user interface 201, and Lxy represents a half of the length of the third user interface 201.

With reference to FIG. 9, the following $(Lxy)^2 = x^2 + y^2$ may be learned based on the Pythagorean theorem, that is, $Lxy = \sqrt{x^2 + y^2}$.

Second, in FIG. 9, the cosine law is used to calculate cos $\alpha = (R-dz)/R$, that is, $dz = R(1-\cos\alpha)$.

Further, because the circle uses the observer 301 as the circle center and uses the distance between the observer 301 and the center point on the third user interface 201 as the radius, that is $\alpha/360° = (Lxy/2\pi R)$, that is $\alpha = (Lxy \times 180°)/\pi R$, where $\alpha$ represents an angle between a connection line between any pixel P and the observer 301 and a connection line between the observer 301 and the center point.

Finally, $\alpha$ is substituted into $dz = R(1-\cos\alpha)$, to obtain $$dz = R\left(1 - \cos\frac{180° \times Lxy}{\pi R}\right).$$

After determining dz, the distance by which each pixel moves on the X axis and the distance by which the pixel moves on the Y axis may be determined based on dz.

Because dz represents the distance by which each pixel on the third user interface moves on the Z axis when the first user interface is generated based on the third user interface, W represents a distance by which each pixel needs to move on the X axis and the Y axis after moving on the Z axis.

It may be learned from FIG. 9 that dx/X=dy/y=W/Lxy.

Similarly, based on the principle of similar triangles, tan $\alpha = Lxy/R = w/dz$, that is, $W = \tan\alpha * dz$, and $\alpha = (Lxy*180°)/$ πR, and if a shifting distance on the X axis needs to be calculated, the distances are substituted into dx/X=W/Lxy, that is $$dx = \frac{W}{Lxy} \times x_0 = \frac{\tan\alpha \times dz}{Lxy} \times x_0 = \frac{\tan\frac{180° \times Lxy}{\pi R} \times dz}{Lxy} \times x_0,$$

that is $$dx = \tan\frac{180° \times Lxy}{\pi R} \times \frac{dz \times x_0}{Lxy}.$$

Similarly, $$dx = \frac{W}{Lxy} \times y_0 = \frac{dz \times \tan\alpha}{Lxy} \times y_0 = \frac{\tan\frac{180° \times Lxy}{\pi R} \times dz}{Lxy} \times y_0,$$

that is, $$dy = \frac{dz \times y_0}{Lxy} \times \tan\frac{180° \times Lxy}{\pi R}$$

may be obtained.

Figure 10:
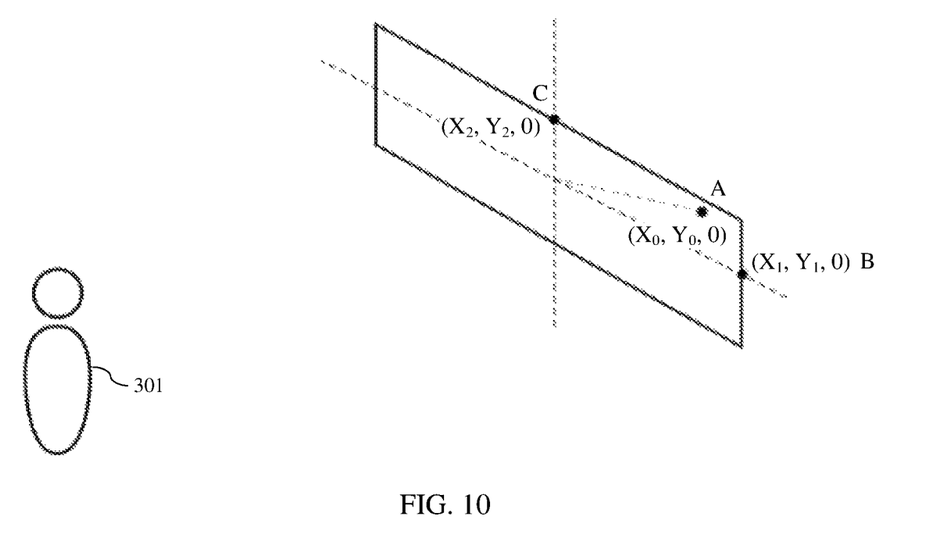
FIG. 10 is a schematic diagram of coordinates of each pixel on a third user interface according to an embodiment of the present invention.

After the distance by which each pixel needs to move on the third user interface is determined, coordinates of each pixel in the three-dimensional coordinate system may be determined based on coordinates of the pixel in a two-dimensional coordinate system shown in FIG. 10 and the distance by which each pixel needs to move. Each pixel is moved to corresponding coordinates in the three-dimensional coordinate system.

For example, because movement principles of all the pixels on the third user interface are the same, in the present disclosure, descriptions are provided by using a pixel A, a pixel B, and a pixel C as an example. First, as shown in FIG. 10, coordinates of the pixel A in the two-dimensional coordinate system are $(x_0, y_0)$, coordinates of the pixel B in the two-dimensional coordinate system are $(x_1, y_1)$, and coordinates of the pixel C in the two-dimensional coordinate system are $(x_2, y_2)$. Because each pixel on the third user interface does not have a depth coordinate value in the two-dimensional coordinate system, when pixels in the two-dimensional coordinate system are represented by coordinates in the three-dimensional coordinate system, coordinates of the pixel A in the three-dimensional coordinate system are $(x_0, y_0, 0)$, coordinates of the pixel B in the three-dimensional coordinate system are $(x_1, y_1, 0)$, and coordinates of the pixel C in the three-dimensional coordinate system are $(x_2, y_2, 0)$. Based on the foregoing formulas, it may be determined that a distance by which the pixel B moves on the Z axis of the three-dimensional coordinate system is dz1, a distance by which the pixel B moves on the X axis is dx1, and a distance by which the pixel B moves on the Y axis is dy1. Because the coordinate of the pixel B in a direction of the Z axis before the movement is 0, the VR device may determine, based on dx1, dy1, and dz1, that coordinates of the pixel B after the movement in the three-dimensional coordinate system is (x1+dx1, y1+dy1, dz1). Based on the foregoing formulas, it may be determined that a distance by which the pixel A moves on the Z axis of the three-dimensional coordinate system is dz0, a distance by which the pixel A moves on the X axis is dx0, and a distance by which the pixel A moves on the Y axis is dy0. Therefore, the VR device may determine, based on dx0, dy0, and dz0, that coordinates of the pixel A after the movement in the three-dimensional coordinate system are $(x_0+dx0, y_0+dy0, dz0)$. Based on the foregoing formulas, it may be determined that a distance by which the pixel C moves on the Z axis of the three-dimensional coordinate system is dz2, a distance by which the pixel C moves on the X axis is dx2, and a distance by which the pixel C moves on the Y axis is dy2. Therefore, the VR device may determine, based on dx2, dz2, and dy2, that coordinates of the pixel C after the movement in the three-dimensional coordinate system are $(x_2+dx2, y_2+dy2, dz2)$.

Figure 11:
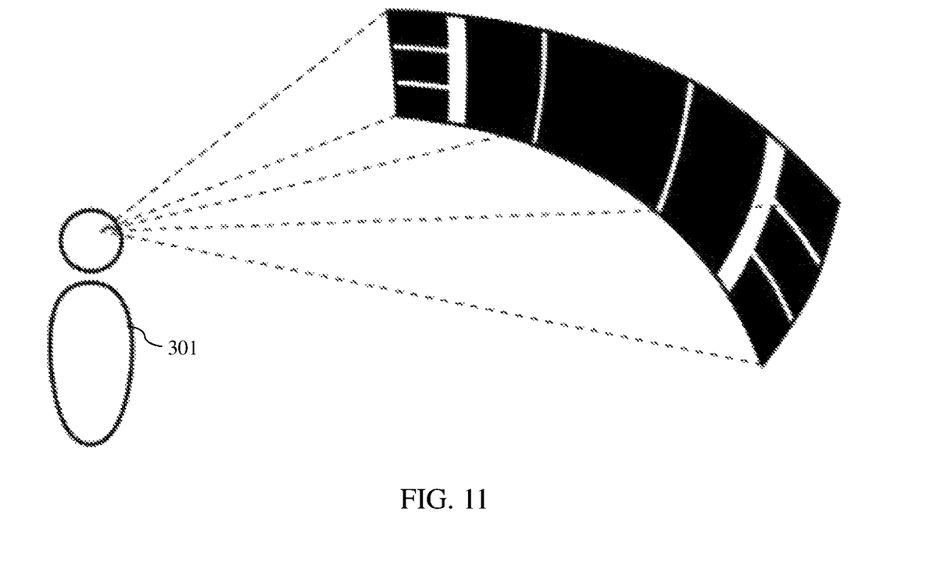
FIG. 11 is a second schematic diagram of a first user interface according to an embodiment of the present invention.

FIG. 11 shows the first user interface finally generated based on the third user interface. Because the distances from all the pixels on the first user interface to the observer are equal, the interface finally displayed by the VR device to the observer may be a double-curvature user interface.

On one aspect, when the VR device provided in this application is implemented by using hardware, for example, as shown in FIG. 4, the CPU 102 is configured to support the VR device 100 in performing step S102, step S1021, step S1023, step S2, and step S1022 in the foregoing embodiments, the display 105 is configured to support the VR device 100 in performing step S103 in the foregoing embodiment, and the communications interface 103 is configured to support the VR device 100 in performing step S1 in the foregoing embodiment. The GPU 101 is further configured to: process the first user interface generated by the CPU 102, for example, perform rendering processing, and use the rendered first user interface as the second user interface for the display 105 to display.

It should be noted that, an example process of performing the foregoing methods by the VR device 100 shown in FIG. 4, may refer to the foregoing embodiments, and details are not described herein again in the present disclosure.

A person of ordinary skill in the art may be aware that, in combination with the examples described in the embodiments disclosed in the present disclosure, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, a detailed working process of the foregoing system, apparatus, and unit, may refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that may store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A virtual reality (VR) interface generation method, comprising:
    obtaining head position information indicating a head position of an observer;
    generating a first user interface based on the obtained head position information, wherein the first user interface forms at least a part of a spherical surface whose center is a portion of the observer's head and distances from all pixels on the first user interface to the portion of the observer's head are equal;
    generating a second user interface based on the generated first user interface; and
    displaying the generated second user interface,
    wherein the generating a first user interface based on the obtained head position information comprises:
    changing a position of each pixel on a third user interface based on the head position information and coordinate information of a center point on the third user interface to generate updated pixels for all the pixels on the third user interface, so that distances from the updated pixels to the portion of the observer's head are equal; and
    generating the first user interface using the updated pixels, wherein the second user interface is a pure planar interface.

2. The method according to claim 1, wherein the changing a position of each pixel on a third user interface based on the head position information and coordinate information of a center point on the third user interface comprises:
    determining a reference distance based on the head position information and the coordinate information of the center point, wherein the reference distance is indicative of a distance between the head of the observer and the center point; and
    changing the position of each pixel on the third user interface based on the reference distance.

3. The method according to claim 2, wherein the changing the position of each pixel on the third user interface based on the reference distance comprises:
    calculating, according to a formula $$dz = R\left(1 - \cos\frac{180° \times Lxy}{\pi R}\right),$$

a distance by which each pixel moves on a Z axis of a three-dimensional coordinate system, wherein dz represents the distance by which the pixel moves on the Z axis, R represents the reference distance, and Lxy represents a half of a length of the third user interface;
    calculating, according to a formula $$dx = \frac{dz * x_0}{Lxy} \times \tan\frac{180° \times Lxy}{\pi R},$$

a distance by which each pixel moves on an X axis of the three-dimensional coordinate system, wherein dx represents the distance by which the pixel moves on the X axis, and $x_0$ represents a parameter of a horizontal coordinate of the pixel on the third user interface;
    calculating, according to a formula $$dy = \frac{dz * y_0}{Lxy} \times \tan\frac{180° \times Lxy}{\pi R},$$

a distance by which each pixel moves on a Y axis of the three-dimensional coordinate system, wherein dy represents the distance by which the pixel moves on the Y axis, and $y_0$ represents a parameter of a vertical coordinate of the pixel on the third user interface; and
    changing the position of each pixel based on the distance by which the pixel moves on the Z axis, the distance by which the pixel moves on the X axis, and the distance by which the pixel moves on the Y axis of the three-dimensional coordinate system.

4. The method according to claim 1, wherein before the changing a position of each pixel on a third user interface based on the head position information and coordinate information of a center point on the third user interface, the method further comprises:
    generating the third user interface based on the head position information and a preconfigured parameter.

5. The method according to claim 4, wherein
    the third user interface comprises a card, a text, and/or a button that have interaction with the observer.

6. The method according to claim 1, wherein the coordinate information of the center point on the third user interface is obtained through default configuration, or obtained based on a parameter input by a user.

7. The method according to claim 1, wherein the generating a second user interface based on the generated first user interface comprises:
receiving a first parameter, wherein the first parameter comprises an interface display ratio, brightness, a hue, saturation, resolution, a color temperature, a distance between the third user interface and the observer, and/or a size of a user interface; and
adjusting the first user interface based on the first parameter, to generate the second user interface.

8. The method of claim 1, wherein distances from all pixels on the first user interface to the central point of the observer's head are equal.

9. The method of claim 1, wherein distances from all pixels on the first user interface to an eye of the observer are equal.

10. A virtual reality (VR) device, wherein the device comprises at least a memory, a sensor system, a display, a central processing unit (CPU), a bus, a communications interface, and a graphics processing unit (GPU), wherein the memory, the sensor system, the display, the central processing unit (CPU), the communications interface, and the graphics processing unit (GPU) are connected by the bus;
the sensor system is configured to: obtain a head position of an observer, and send, to the CPU, head position information indicating the head position of the observer;
the memory stores instructions, that when executed by the CPU, cause the CPU to generate a first user interface based on the head position information, wherein the first user interface forms at least a part of a spherical surface whose center is a portion of the observer's head and distances from all pixels on the first user interface to the portion of the observer's head are equal;
the graphics processing unit (GPU) is configured to generate a second user interface based on the first user interface; and
the display is configured to display the generated second user interface, wherein the CPU is further configured to:
change a position of each pixel on a third user interface based on the head position information and coordinate information of a center point on the third user interface to generate updated pixels for all the pixels on the third user interface, so that distances from the updated pixels to the portion of the observer's head are equal; and generate the first user interface based on the updated pixels,
wherein the second user interface is a pure planar interface.

11. The device according to claim 10, wherein the third user interface is a pure planar interface.

12. The device according to claim 10, wherein the CPU is further configured to: determine a reference distance based on the head position information and the coordinate information of the center point, wherein the reference distance indicates a distance between the head of the observer and the center point; and change the position of each pixel on the third user interface based on the reference distance.

13. The device according to claim 12, wherein the CPU is further configured to:
calculate, according to a formula $$dz = R\left(1 - \cos\frac{180° \times Lxy}{\pi R}\right),$$

a distance by which each pixel moves on a Z axis of a three-dimensional coordinate system, wherein dz represents the distance by which the pixel moves on the Z axis, R represents the reference distance, and Lxy represents a half of a length of the third user interface;
calculate, according to a formula $$dx = \frac{dz * x_0}{Lxy} \times \tan\frac{180° \times Lxy}{\pi R},$$

a distance by which each pixel moves on an X axis of the three-dimensional coordinate system, wherein dx represents the distance by which the pixel moves on the X axis, and $x_0$ represents a parameter of a horizontal coordinate of the pixel on the third user interface;
calculate, according to a formula $$dy = \frac{dz * y_0}{Lxy} \times \tan\frac{180° \times Lxy}{\pi R},$$

a distance by which each pixel moves on a Y axis of the three-dimensional coordinate system, wherein dy represents the distance by which the pixel moves on the Y axis, and $y_0$ represents a parameter of a vertical coordinate of the pixel on the third user interface; and
change the position of each pixel based on the distance by which the pixel moves on the Z axis, the distance by which the pixel moves on the X axis, and the distance by which the pixel moves on the Y axis of the three-dimensional coordinate system.

14. The device according to claim 10, wherein the CPU is further configured to generate the third user interface based on the head position information and a preconfigured parameter.

15. The device according to claim 14, wherein the third user interface comprises a card, a text, and/or a button that have interaction with the observer.

16. The device according to claim 11, wherein the coordinate information of the center point on the third user interface is obtained through default configuration, or obtained based on a parameter input by a user.

17. The device according to claim 10, wherein the communications interface is configured to receive a first parameter, wherein the first parameter comprises an interface display ratio, brightness, a hue, saturation, a resolution, a color temperature, a distance between the third user interface and the observer, and/or a size of a user interface; and
the CPU is configured to adjust the first user interface based on the first parameter, to generate the second user interface.

18. A non-transitory storage medium, comprising instructions, that when performed by one or more processors, cause the one or more processors to perform virtual reality (VR) interface generation operations comprising:
obtaining head position information indicating a head position of an observer;
generating a first user interface based on the head position information, wherein the first user interface forms at least a part of a spherical surface whose center is a portion of the observer's head and distances from all pixels on the first user interface to the portion of the observer's head are equal;

generating a second user interface based on the generated first user interface; and
displaying the generated second user interface, wherein the generation of the first user interface comprises:
changing a position of each pixel on a third user interface based on the head position information and coordinate information of a center point on the third user interface to generate updated pixels for all the pixels on the third user interface, wherein distances from the updated pixels to the portion of the observer's head are equal; and
generating the first user interface using the updated pixels, wherein the second user interface is a pure planar interface.

* * * * *